(12) United States Patent
Sandoval et al.

(10) Patent No.: US 10,851,213 B2
(45) Date of Patent: Dec. 1, 2020

(54) METHOD FOR OPTIMIZING A HEGMAN RATING OF A DILUTED EMULSION, A DILUTED EMULSION PRODUCED THEREBY, AND A COATING MADE

(71) Applicant: Dow Global Technologies LLC, Midland, MI (US)

(72) Inventors: Robert W. Sandoval, Crystal Lake, IL (US); Timothy J. Young, Midland, MI (US); David L. Malotky, Midland, MI (US); Gary E. Spilman, Northville, MI (US); Douglas J. Hasso, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 202 days.

(21) Appl. No.: 15/322,124

(22) PCT Filed: Jun. 10, 2015

(86) PCT No.: PCT/US2015/035002
§ 371 (c)(1),
(2) Date: Dec. 26, 2016

(87) PCT Pub. No.: WO2015/199980
PCT Pub. Date: Dec. 30, 2015

(65) Prior Publication Data
US 2017/0137580 A1 May 18, 2017

Related U.S. Application Data

(60) Provisional application No. 62/018,096, filed on Jun. 27, 2014.

(51) Int. Cl.
*C08J 3/03* (2006.01)
*C09D 5/02* (2006.01)
(Continued)

(52) U.S. Cl.
CPC .................. *C08J 3/03* (2013.01); *B01F 3/08* (2013.01); *B01F 3/0803* (2013.01);
(Continued)

(58) Field of Classification Search
CPC .......... C09D 163/00–10; C09D 167/00; C09D 167/08; C09D 5/022; C08J 3/03; C08J 3/05; B01F 3/08–088; B01F 2003/0823–0849
See application file for complete search history.

(56) References Cited

U.S. PATENT DOCUMENTS 3,645,992 A 2/1972 Elston
3,686,359 A 8/1972 Soldatos et al.
(Continued)

FOREIGN PATENT DOCUMENTS

WO WO2014/019542 2/2014

OTHER PUBLICATIONS

Australian office action dated Jul. 18, 2018; from counterpart Australian Application No. 2015280528.
(Continued)

*Primary Examiner* — Kregg T Brooks (57) ABSTRACT

A method for optimizing a Hegman rating of a diluted emulsion including adjusting the shear work in the dilution mixer, wherein the adjusting the shear work may comprise raising or lowering the shear work; adjusting the temperature of the concentrated and/or diluted emulsion; if not earlier added, adding a basic aqueous solution and/or dispersing agent; adding one or more other additives; and/or adjusting the amount of any additive, basic solution or surfactant solution is provided. Also provided are diluted emulsions produced thereby and coatings made from the diluted emulsions.

8 Claims, 3 Drawing Sheets

(51) Int. Cl.
  *C09D 5/00* (2006.01)
  *C09D 163/00* (2006.01)
  *C08J 3/05* (2006.01)
  *C09D 167/00* (2006.01)
  *C09D 167/08* (2006.01)
  *B01F 3/08* (2006.01)

(52) U.S. Cl.
  CPC .......... *B01F 3/0807* (2013.01); *B01F 3/0811* (2013.01); *C08J 3/05* (2013.01); *C09D 5/00* (2013.01); *C09D 5/022* (2013.01); *C09D 5/027* (2013.01); *C09D 163/00* (2013.01); *C09D 167/00* (2013.01); *C09D 167/08* (2013.01); *B01F 2003/0849* (2013.01); *C08J 2363/00* (2013.01); *C08J 2367/08* (2013.01)

(56) References Cited

U.S. PATENT DOCUMENTS

| | | | |
|---|---|---|---|
| 4,066,628 A | 1/1978 | Ashida et al. | |
| 4,076,698 A | 2/1978 | Anderson et al. | |
| 4,438,254 A | 3/1984 | Doorakian et al. | |
| 4,480,082 A | 10/1984 | McLean et al. | |
| 4,599,392 A | 7/1986 | McKinney et al. | |
| 4,988,781 A | 1/1991 | McKinney et al. | |
| 5,089,588 A | 2/1992 | White et al. | |
| 5,115,075 A | 5/1992 | Brennen et al. | |
| 5,171,820 A | 12/1992 | Mang et al. | |
| 5,246,751 A | 9/1993 | White et al. | |
| 5,272,236 A | 12/1993 | Lai et al. | |
| 5,278,272 A | 1/1994 | Lai et al. | |
| 5,378,757 A * | 1/1995 | Blount, Jr. | C08G 63/48 524/601 |
| 5,677,383 A | 10/1997 | Chum et al. | |
| 5,844,045 A | 12/1998 | Kolthammer et al. | |
| 5,869,575 A | 2/1999 | Kolthammer et al. | |
| 6,111,023 A | 8/2000 | Chum et al. | |
| 6,316,549 B1 | 11/2001 | Chum et al. | |
| 6,448,341 B1 | 9/2002 | Kolthammer et al. | |
| 6,538,070 B1 | 3/2003 | Cardwell et al. | |
| 6,566,446 B1 | 5/2003 | Parikh et al. | |
| 8,557,588 B2 | 10/2013 | Oddie | |
| 2014/0024742 A1* | 1/2014 | Kan | C09D 167/08 523/402 |

OTHER PUBLICATIONS

EP Office Action; from counterpart EP Application No. 15795008.0.
PCT Search Report dated Dec. 17, 2015; from counterpart PCT Application No. PCT/US201/035002.
PCT IPRP Report dated Dec. 27, 2016; from counterpart PCT Application No. PCT/US201/035002.
EP Response to Office Action dated Aug. 9, 2017; from EP couterpart Application No. 15795008.0.
EP Office Action dated Oct. 18, 2017; from EP counterpart Application No. 15795008.8.
He, Ye et al.; "Coating Resin Chemistry," Chemical Industry Press, (Aug. 2007), p. 151.
Chinese Office Action; from counterpart Chinese Application No. 201580033135.0.

* cited by examiner

METHOD FOR OPTIMIZING A HEGMAN RATING OF A DILUTED EMULSION, A DILUTED EMULSION PRODUCED THEREBY, AND A COATING MADE

FIELD OF INVENTION

The instant invention relates to a method for optimizing a Hegman rating of a diluted emulsion, a diluted emulsion produced thereby, and a coating made therefrom.

BACKGROUND OF THE INVENTION

Various types of coatings may be made using aqueous polymer emulsions, including for example, automotive coatings, architectural, and industrial coatings and on a large range of substrates, such as wood, polymer, concrete, rubber, and metal. Different coating end uses require different Hegman ratings. For example, Hegman ratings of equal to or greater than 7 are desirable for high gloss top coatings. Particle agglomerates, or grit, in the polymer emulsion may negatively impact the Hegman rating of a coating made with the polymer emulsion. Specifically, the larger the particle agglomerate, the lower Hegman rating of the coating made therefrom. In addition, large grit may further negatively impact the chemical and corrosion resistance of coatings due to decreased film integrity.

A method for tailoring the grit size and/or minimizing large grit would be beneficial in the production of a diluted emulsion for use in making coatings.

SUMMARY OF THE INVENTION

The instant invention is a method for optimizing a Hegman rating of a diluted emulsion, a diluted emulsion produced thereby, and a coating made therefrom.

In one embodiment, the instant invention provides a method for optimizing a Hegman rating of a diluted emulsion comprising: (a) feeding a molten polymer resin into a melt kneader, which may include surfactant and/or water; (b) optionally feeding a basic aqueous solution and/or a dispersing agent into the melt kneader to form a concentrated emulsion, wherein the concentrated emulsion comprises from greater than 60 wt % polymer resin solids; (c) feeding the concentrated emulsion into a dilution mixer wherein water is continuously or in a single or multi-stage manner added to the concentrated emulsion to dilute the concentrated emulsion to form an diluted emulsion, wherein the diluted emulsion comprises equal to or less than 70 wt % polymer resin solids; (d) measuring a first Hegman rating of a first sample of the diluted emulsion; (e) determining if the first Hegman rating of the first sample is acceptable for an intended end use application; (f) if the first Hegman rating of the first sample is not acceptable, adjusting the shear work in the dilution mixer, wherein the adjusting the shear work may comprise raising or lowering the shear work; (g) measuring a second Hegman rating of a second sample of the diluted emulsion; (h) determining if the second Hegman rating of the second sample is acceptable for the intended end use application; (j) if the second Hegman rating of the second sample is not acceptable, adjusting the temperature of the concentrated and/or diluted emulsion; (k) measuring a third Hegman rating of a third sample of the diluted emulsion; (l) determining if the third Hegman rating of the third sample is acceptable for the intended end use application; and (m) if the third Hegman rating of the third sample is not acceptable, conducting one or more steps selected from the group consisting of (i) if not earlier added, adding a basic aqueous solution and/or surfactant solution; (ii) adding one or more other additives; and (iii) adjusting the amount of any additive, basic solution or surfactant solution; (n) if the fourth Hegman rating is not acceptable, repeating any one or more of steps (f), (j) and (m); and (o) if the first, second, third or fourth Hegman rating is acceptable, collecting the diluted emulsion.

DETAILED DESCRIPTION OF THE INVENTION

The instant invention is a method for optimizing a Hegman rating of a diluted emulsion, a diluted emulsion produced thereby, and a coating made therefrom.

As used herein, the term emulsion is used to refer to both liquid-liquid and liquid-solid mixtures and may be used interchangeably with the term "dispersion." One skilled in the art would readily understand that certain polymers will be in a molten state in the melt kneader whereas other polymers may exist in a liquid state in the melt kneader.

The method for optimizing a Hegman rating of a diluted emulsion according to the present invention comprises: (a) feeding a molten polymer resin into a melt kneader; (b) optionally feeding a basic aqueous solution and/or a dispersing agent into the melt kneader to form a concentrated emulsion, wherein the concentrated emulsion comprises greater than 60 wt % polymer resin solids; (c) feeding the concentrated emulsion into a dilution mixer wherein water is continuously or in a single or multi-stage manner added to the concentrated emulsion to dilute the concentrated emulsion to form an diluted emulsion, wherein the diluted emulsion comprises equal to or less than 70 wt % polymer resin solids; (d) measuring a first Hegman rating of a first sample of the diluted emulsion; (e) determining if the first Hegman rating of the first sample is acceptable for an intended end use application; (f) if the first Hegman rating of the first sample is not acceptable, adjusting the shear work in the dilution mixer, wherein the adjusting the shear work may comprise raising or lowering the shear work; (g) measuring a second Hegman rating of a second sample of the diluted emulsion; (h) determining if the second Hegman rating of the second sample is acceptable for the intended end use application; (j) if the second Hegman rating of the second sample is not acceptable, adjusting the temperature of the concentrated and/or diluted emulsion; (k) measuring a third Hegman rating of a third sample of the diluted emulsion; (l) determining if the third Hegman rating of the third sample is acceptable for the intended end use application; and (m) if the third Hegman rating of the third sample is not acceptable, conducting one or more steps selected from the group consisting of (i) if not earlier added, adding a basic aqueous solution and/or surfactant solution; (ii) adding one or more other additives; and (iii) adjusting the amount of any additive, basic solution or surfactant solution; (n) if the fourth Hegman rating is not acceptable, repeating any one or more of steps (f), (j) and (m); and (o) if the first, second, third or fourth Hegman rating is acceptable, collecting the diluted emulsion.

In an alternative embodiment, the present invention further provides a diluted emulsion made according to any embodiment of the method described herein.

In yet another embodiment, the present invention further provides a coating made from any embodiment of the diluted emulsion described herein.

Figure 1:
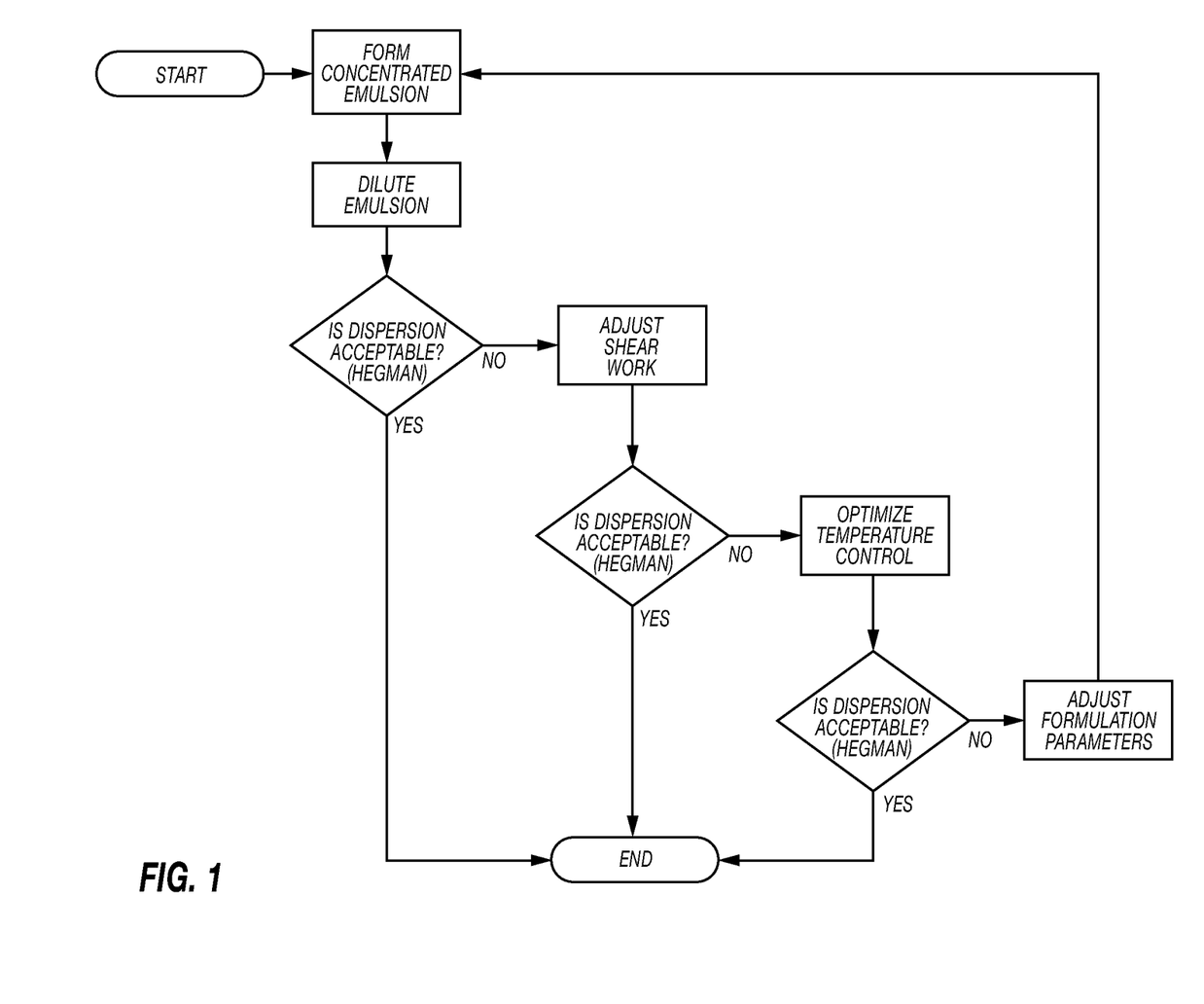
FIG. 1 is a flowchart showing the process in accordance with an embodiment of the present invention.

FIG. 1 is a flow diagram illustrating the process for optimizing a Hegman rating of a diluted emulsion. As used herein, the term "melt kneader" includes one or more selected from the group consisting of kneaders, compounders, mixers, blenders, single-screw extruders, multi-screw extruders, and melt pump(s) in connection with rotor stator(s). Commercial examples of mixers include those known as BANBURY mixers. Muti-screw extruders include, for example, twin-screw extruders.

In a first step of the process, a molten polymer resin is fed into the melt kneader. Any thermoplastic polymer resin may be used, including without limitation, homopolymers, copolymers, interpolymers, and blends thereof. The thermoplastic resin included in embodiments of the present invention is a resin that is not readily dispersible in water by itself. The term "resin" used herein should be construed to include synthetic polymers or chemically modified natural resins such as but not limited to thermoplastic materials such as polyvinyl chloride, polystyrene, and polyethylene and thermosetting materials such as polyesters, epoxies, and silicones that are used with fillers, stabilizers, pigments, and other components to form plastics. The term resin as used herein includes elastomers and is understood to include blends of olefin polymers. In some embodiments, the thermoplastic resin is a semicrystalline resin. The term "semicrystalline" is intended to identify those resins that possess at least one endotherm when subjected to standard differential scanning calorimetry (DSC) evaluation. Some semicrystalline polymers exhibit a DSC endotherm that exhibits a relatively gentle slope as the scanning temperature is increased past the final endotherm maximum. This reflects a polymer of broad melting range rather than a polymer having what is generally considered to be a sharp melting point. Some polymers useful in the emulsions of the invention have a single melting point while other polymers have more than one melting point. In some polymers one or more of the melting points may be sharp such that all or a portion of the polymer melts over a fairly narrow temperature range, such as a few degrees centigrade. In other embodiments, the polymer may exhibit broad melting characteristics over a range of about 20° C.

Examples of the thermoplastic resin which may be used in the present invention include homopolymers and copolymers (including elastomers) of an alpha-olefin such as ethylene, propylene, 1-butene, 3-methyl-1-butene, 4-methyl-1-pentene, 3-methyl-1-pentene, 1-heptene, 1-hexene, 1-octene, 1-decene, and 1-dodecene as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene as typically represented by ethylene-butadiene copolymer and ethylene-ethylidene norbornene copolymer; and polyolefins (including elastomers) such as copolymers of two or more alpha-olefins with a conjugated or non-conjugated diene as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth) acrylic acid copolymers, and ethylene-(meth)acrylate copolymer; styrenic copolymers (including elastomers) such as polystyrene, ABS, acrylonitrile-styrene copolymer, .alpha.-methylstyrene-styrene copolymer; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6,6, and nylon 12; thermoplastic polyesters such as polyethylene terephthalate and polybutylene terephthalate; polycarbonate, polyphenylene oxide, and the like. These resins may be used either alone or in combinations of two or more.

In particular embodiments, polyolefins such as polypropylene, polyethylene, and copolymers thereof and blends thereof, as well as ethylene-propylenediene terpolymers. In some embodiments, preferred olefinic polymers include homogeneous polymers described in U.S. Pat. No. 3,645,992 by Elston; high density polyethylene (HDPE) as described in U.S. Pat. No. 4,076,698 to Anderson, heterogeneously branched linear low density polyethylene (LLDPE); heterogeneously branched ultra low linear density (ULDPE); homogeneously branched, linear ethylene/alpha-olefin copolymers; homogeneously branched, substantially linear ethylene/alpha-olefin polymers which can be prepared, for example, by a process disclosed in U.S. Pat. Nos. 5,272,236 and 5,278,272, the disclosure of which process is incorporated herein by reference; and high pressure, free radical polymerized ethylene polymers and copolymers such as low density polyethylene (LDPE), ethylene-acrylic acid (EAA) and Ethylene-methacrylic acid copolymers such as for example those available under the tradenames PRIMACOR, NUCREL, and ESCOR and described in U.S. Pat. Nos. 4,599,392, 4,988,781, and 5,938,4373, each of which is incorporated herein by reference in its entirety, and ethylene-vinyl acetate (EVA) copolymers. Polymer compositions described in U.S. Pat. Nos. 6,538,070, 6,566,446, 5,869,575, 6,448,341, 5,677,383, 6,316,549, 6,111,023, or 5,844,045, each of which is incorporated herein by reference in its entirety, are also suitable in some embodiments. Of course, blends of polymers can be used as well. In some embodiments the blends include two different Ziegler-Natta polymers. In other embodiments, the blends can include blends of a Ziegler-Natta and a metallocene polymer. In still other embodiments, the thermoplastic resin used herein is a blend of two different metallocene polymers.

Alkyd resins may also be used as the thermoplastic resin in the inventive process. Alkyd resins are polyesters of polyhydroxyl alcohols and polycarboxylic acids chemically combined with various drying and semi-drying oils in different proportions. Polyhydroxyl alcohols may include, but are not limited to, such components as ethylene glycol, diethylene glycol, neopentyl glycol, 1,4-butanediol, 1,6-hexanediol, glycerol, pentaerythritol, sorbitol and mannitol.

Suitable glycols include, but are not limited to, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, neopentyl glycol, glycerol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4- tetramethyl-1,3-cyclobutanediol, p-xylenediol, hydroxypivalyl hydroxypivalate, 1,10-decanediol, hydrogenated bisphenol A, trimethylolpropane, trimethylolethane, pentaerythritol, erythritol, threitol, dipentaerythritol, sorbitol, mannitol, glycerine, trimellitic anhydride, pyromellitic dianhydride, dimethylolpropionic acid, and the like.

Polycarboxylic acids may include, but are not limited to, phthalic acid, maleic acid, fumaric acid, isophthalic acid, succinic acid, adipic acid, azeleic acid, and sebacic acid, terephthalic acid, tetrachlorophthalic anhydride, tetrahydrophthalic anhydride, dodecanedioic acid, sebacic acid, azelaic acid, 1,4-cyclohexanedicarboxylic acid, 1,3-cyclohexanedicarboxylic acid, 2,6-naphthalenedicarboxylic acid, glutaric acid, as well as from anhydrides of such acids, and esters thereof, where they exist.

Drying oils may include, but are not limited to, coconut oil, fish oil, linseed oil, tung oil, castor oil, cottonseed oil, safflower oil, sunflower oil, soybean oil, and tall oil.

In addition to an amount of polyol reacted with a fatty acid, fatty ester, or naturally occurring-partially saponified oil, an additional amount of a polyol or other branching agent such as a polycarboxylic acid may be used to increase the molecular weight and branching of the alkyd resin, and may be selected from the group consisting of trimethylolethane, pentaerythritol, erythritol, threitol, dipentaerythritol, sorbitol, glycerine, trimellitic anhydride, pyromellitic dianhydride, dimethylolpropionic acid, and trimethylolpropane.

Alkyds may be produced, for example, by direct fusion of glycerol, phthalic anhydride and drying oil. Solvents may be added to reduce the viscosity. Various proportions of the polycarboxylic acid, polyhydric alcohol, and oil are used to obtain alkyd resins of various properties, as is well known in the art.

In yet another embodiment of the inventive process, the thermoplastic polymer comprises an epoxy resin. Epoxy resin refers to a composition which possesses one or more vicinal epoxy groups per molecule, that is, at least one 1,2-epoxy group per molecule. In general, such compound is a saturated or unsaturated aliphatic, cycloaliphatic, aromatic or heterocyclic compound which possesses at least one 1,2-epoxy group. Such compound can be substituted, if desired, with one or more non-interfering substituents, such as halogen atoms, hydroxy groups, ether radicals, lower alkyls and the like.

Illustrative epoxies are described in the Handbook of Epoxy Resins by H. E. Lee and K. Neville published in 1967 by McGraw-Hill, New York and U.S. Pat. No. 4,066,628, incorporated herein by reference.

Particularly useful compounds which can be used in the practice of the present invention are epoxy resins having the following formula:

nyl)-1-phenyl ethane), bisphenol F, bisphenol K, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins tetramethylbiphenol, tetramethyl-tetrabromobiphenol, tetramethyltribromobiphenol, tetrachlorobisphenol A and any combination thereof.

Examples of diepoxides particularly useful in the present invention include diglycidyl ether of 2,2-bis(4-hydroxyphenyl)propane (generally referred to as bisphenol A) and diglycidyl ether of 2,2-bis(3,5-dibromo-4-hydroxyphenyl)propane (generally referred to as tetrabromobisphenol A). Mixtures of any two or more polyepoxides can also be used in the practice of the present invention.

Other diepoxides which can be employed in the practice of the present invention include the diglycidyl ethers of dihydric phenols, such as those described in U.S. Pat. Nos. 5,246,751; 5,115,075; 5,089,588; 4,480,082 and 4,438,254, all of which are incorporated herein by reference, or the diglycidyl esters of dicarboxylic acids such as those described in U.S. Pat. No. 5,171,820. Other suitable diepoxides include for example, .alpha.omega.-diglycidyloxy-isopropylidene-bisphenol-based epoxy resins (commercially known as D.E.R.® 300 and 600 series epoxy resins, products of The Dow Chemical Company, Midland, Mich.).

The epoxy resins which can be employed in the practice of the present invention also include epoxy resins prepared either by reaction of diglycidyl ethers of dihydric phenols with dihydric phenols or by reaction of dihydric phenols with epichlorohydrin (also known as "taffy resins").

Exemplary epoxy resins include, for example, the diglycidyl ethers of bisphenol A; 4,4'-sulfonyldiphenol; 4,4-oxydiphenol; 4,4'-dihydroxybenzophenone; resorcinol; hydroquinone; 9,9'-bis(4-hydroxyphenyl)fluorene; 4,4'-dihydroxybiphenyl or 4,4'-dihydroxy-.alpha.-methylstilbene and the diglycidyl esters of the dicarboxylic acids.

Other useful epoxide compounds which can be used in the practice of the present invention are cycloaliphatic epoxides. A cycloaliphatic epoxide consists of a saturated carbon ring having an epoxy oxygen bonded to two vicinal atoms in the carbon ring for example as illustrated by the following general formula:

where n has an average value of 0 or more.

The epoxy resins useful in the present invention may include, for example, the glycidyl polyethers of polyhydric phenols and polyhydric alcohols. As an illustration of the present invention, examples of known epoxy resins that may be used in the present invention, include for example, the diglycidyl ethers of resorcinol, catechol, hydroquinone, bisphenol, bisphenol A, bisphenol AP (1,1-bis(4-hydroxyphenyl)

wherein R is a hydrocarbon group optionally comprising one or more heteroatoms (such as, without limitation thereto Cl, Br, and S), or an atom or group of atoms forming a stable bond with carbon (such as, without limitation thereto, Si, P and B) and wherein n is greater than or equal to 1.

The cycloaliphatic epoxide may be a monoepoxide, a diepoxide, a polyepoxide, or a mixture of those. For example, any of the cycloaliphatic epoxide described in U.S. Pat. No. 3,686,359, incorporated herein by reference, may be used in the present invention. As an illustration, the cycloaliphatic epoxides that may be used in the present invention include, for example, (3,4-epoxycyclohexyl-methyl)-3,4-epoxy-cyclohexane carboxylate, bis-(3,4-epoxycyclohexyl)adipate, vinylcyclohexene monoxide and mixtures thereof.

Figure 2:
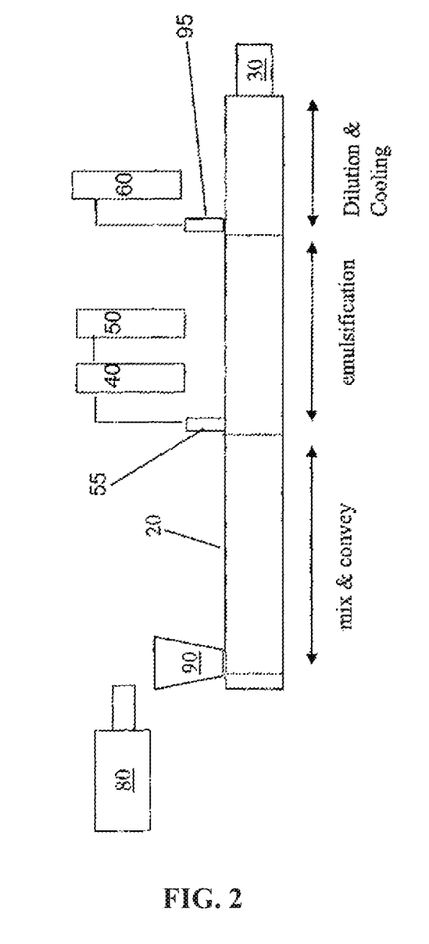
FIG. 2 is a schematic representation of a typical melt-extrusion apparatus useful in the inventive process.

FIG. 2 schematically illustrates such an extrusion apparatus embodiments of the invention. An extruder, in certain embodiments a twin screw extruder, 20 is coupled to a back pressure regulator, melt pump, or gear pump, 30. Embodiments also provide a base reservoir, 40 and an initial water reservoir 50, each of which includes a pump (not shown). Desired amounts of base and initial water are provided from the base reservoir 40 and the initial water reservoir 50, respectively. Any suitable pump may be used, but in some embodiments a pump that provides a flow of about 150 cc/min at a pressure of 240 bar is used to provide the base and the initial water to the extruder 20. In other embodiments, a liquid injection pump provides a flow of 300 cc/min at 200 bar or 600 cc/min at 133 bar. In some embodiments the base and initial water are preheated in a preheater.

Resin in the form of pellets, powder or flakes is fed from the feeder 80 to an inlet 90 of the extruder 20 where the resin is melted or compounded. In some embodiments, the dispersing agent is added to the resin along with the resin and in other embodiments, the dispersing agent is provided separately to the twin screw extruder 20. The resin melt is then delivered from the mix and convey zone to an emulsification zone of the extruder where the initial amount of water and base from the reservoirs 40 and 50 is added through inlet 55. In some embodiments, dispersing agent may be added additionally or exclusively to the water stream. In some embodiments, the emulsified mixture is further diluted with additional water inlet 95 from reservoir 60 in a dilution and cooling zone of the extruder 20. Typically, the emulsion is diluted to at least 30 weight percent water in the cooling zone. In addition, the diluted mixture may be diluted any number of times until the desired dilution level is achieved. In some embodiments, water is not added into the twin screw extruder 20 but rather to a stream containing the resin melt after the melt has exited from the extruder. In this manner, steam pressure build-up in the extruder 20 is eliminated.

In a second step of the process, feeding a basic aqueous solution and/or a dispersing agent into the melt kneader to form a concentrated emulsion, wherein the concentrated emulsion comprises greater than 60 wt % polymer resin. All individual values and subranges from greater than or equal to 60 wt % polymer resin are included and disclosed herein; for example, the concentrated emulsion can have a polymer resin content greater than 60 wt %, or in the alternative, greater than 64 wt %, or in the alternative, greater than 68 wt %, or in the alternative, greater than 72 wt %, or in the alternative, greater than 76 wt %, greater than 80 wt %, or in the alternative, greater than 85 wt %.

Figure 3:
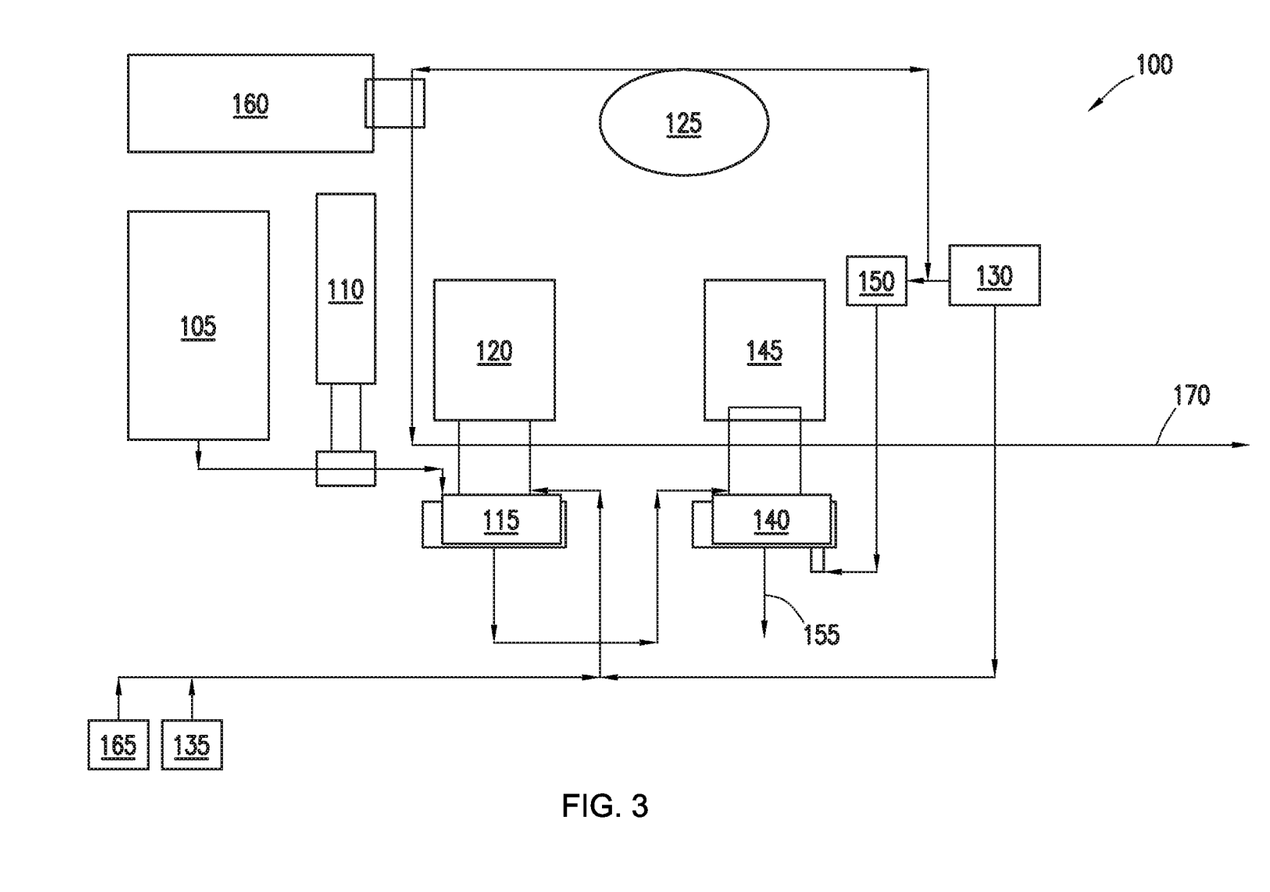
FIG. 3 is a schematic representation of a typical rotor/stator apparatus useful in the inventive process.

FIG. 3 schematically represents a typical rotor-stator apparatus 100 which may be used in some embodiments of the present invention. Referring to FIG. 3, melted resin is fed from feed tank 105 by use of a pump 110 into the rotor-stator portion 115 (mixing elements) of a primary mixer 120. Initial water from the distilled water supply 125 may also be fed into the rotor-stator 115 by use of pump 130. Surfactant may also be fed into primary mixer 120 by use of pump 135. Basic aqueous solution may also be fed into primary mixer 120 by use of pump 165. Initially mixed resin exiting the primary mixer 120 is fed into a rotor-stator portion 140 of a secondary mixer 145. Dilution water may also be fed into the secondary mixer 145 by use of pump 150 fed by the distilled water supply 125. Product may be removed from the secondary mixer 145 through line 155. Back pressure pump 160 is also provided to maintain pressure in the apparatus 100 as needed. Line 170 is a drain line. One of ordinary skill in the art will understand that additional common components, such as check valves, flow meters, back pressure regulators, and ball valves, (not shown) are generally used in the apparatus 100.

In some embodiments a basic substance or basic aqueous solution, emulsion or slurry thereof is added to the emulsion at any point of the process, preferably to the extruder. Typically the basic substance is added as an aqueous solution. But in some embodiments, it is added in other convenient forms, such as pellets or granules. In some embodiments, the basic substance and water are added through separate inlets of the extruder. Examples of the basic substance which may be used for the neutralization or the saponification in the melt kneading process include alkaline metals and alkaline earth metals such as sodium, potassium, calcium, strontium, barium; inorganic amines such as hydroxylamine or hydrazine; organic amines such as methylamine, ethylamine, ethanolamine, cyclohexylamine, tetramethylammonium hydroxide; oxide, hydroxide, and hydride of alkaline metals and alkaline earth metals such as sodium oxide, sodium peroxide, potassium oxide, potassium peroxide, calcium oxide, strontium oxide, barium oxide, sodium hydroxide, potassium hydroxide, calcium hydroxide, strontium hydride, barium hydroxide, sodium hydride, potassium hydride, calcium hydride; and weak acid salts of alkaline metals and alkaline earth metals such as sodium carbonate, potassium carbonate, sodium hydrogencarbonate, potassium hydrogencarbonate, calcium hydrogencarbonate, sodium acetate, potassium acetate, calcium acetate; or ammonium hydroxide. In particular embodiments, the basic substance is a hydroxide of an alkaline metal or a hydroxide of an alkali metal. In some embodiments, the basic substance is selected from potassium hydroxide, sodium hydroxide and combinations thereof.

Any suitable dispersing agent can be used. However, in particular embodiments, the dispersing agent comprises at least one carboxylic acid, a salt of at least one carboxylic acid, or carboxylic acid ester or salt of the carboxylic acid ester. One example of a carboxylic acid useful as a dispersing agent is a fatty acid such as montanic acid. In some preferred embodiments, the carboxylic acid, the salt of the carboxylic acid, or at least one carboxylic acid fragment of the carboxylic acid ester or at least one carboxylic acid fragment of the salt of the carboxylic acid ester has fewer than 25 carbon atoms. In other embodiments, the carboxylic acid, the salt of the carboxylic acid, or at least one carboxylic acid fragment of the carboxylic acid ester or at least one carboxylic acid fragment of the salt of the carboxylic acid ester has 12 to 25 carbon atoms. In some embodiments, carboxylic acids, salts of the carboxylic acid, at least one carboxylic acid fragment of the carboxylic acid ester or its salt has 15 to 25 carbon atoms are preferred. In other embodiments, the number of carbon atoms is 25 to 60. Some preferred salts comprise a cation selected from the group consisting of an alkali metal cation, alkaline earth metal cation, or ammonium or alkyl ammonium cation.

In still other embodiments, the dispersing agent is selected from the group consisting of ethylene carboxylic acid polymers, and their salts, such as ethylene acrylic acid copolymers or ethylene methacrylic acid copolymers.

In other embodiments, the dispersing agent is selected from alkyl ether carboxylates, petroleum sulfonates sulfonated polyoxyethylenated alcohol, sulfated or phosphated polyoxyethylenated alcohols, polymeric ethylene oxide/propylene oxide/ethylene oxide surfactantts, primary and secondary alcohol ethoxylates, alkyl glycosides and alkyl glycerides.

Combinations any of the above-enumerated dispersing agents can also be used to prepare the diluted emulsions.

In a particular embodiment, the concentrated emulsion has a volume average particle size from 0.05 to 5 microns. All individual values and subranges from 0.05 to 5 microns are included and disclosed herein; for example, the average particle size can be from a lower limit of 0.05, 0.1, 0.5, 1.5, 2.5, or 3.5 microns to an upper limit of 1, 2, 3, 4, or 5 microns. For example, the average particle size of the concentrated emulsion can have an average particle size from 0.05 to 5 microns, or in the alternative, from 0.05 to 2.5 microns, or in the alternative, from 2.5 to 5 microns, or in the alternative, from 1 to 4 microns, or in the alternative, from 0.75 to 3.5 microns.

The third step of the process involves feeding the concentrated emulsion into a dilution mixer wherein water is continuously or in a single or multi-stage manner added to the concentrated emulsion to dilute the concentrated emulsion to form a diluted emulsion, wherein the diluted emulsion comprises equal to or less than 70 wt % polymer resin. The dilution mixer may be a separate component from the melt kneader or may alternatively be a downstream section of the melt kneader or a combination thereof. The water may be added in a single or multi-stage manner into the dilution mixer. In a multi-stage manner, the water may be added in 2 or more stages. All individual values from 2 or more stages are disclosed and included herein. For example, the water may be added to the dilution mixer in 2, 3, 4, 5, 6 or 10 stages. The diluted emulsion comprises equal to or less than 70 wt % polymer resin. All individual values and subranges from equal to or less than 70 wt % are included and disclosed herein; for example, the diluted emulsion can be from an upper limit of 70, 60, 50, 40 or 30 wt %. In a particular embodiment, the diluted emulsion has a lower limit of 25 wt %. For example, the diluted emulsion can comprise from 60 to 70 wt % polymer resin, or in the alternative, the diluted emulsion can comprise from 50 to 70 wt % polymer resin, or in the alternative, the diluted emulsion can comprise from 30 to 70 wt % polymer resin, or in the alternative, the diluted emulsion can comprise from 40 to 60 wt % polymer resin, or in the alternative, the diluted emulsion can comprise from 65 to 35 wt % polymer resin, or in the alternative, the diluted emulsion can comprise from 25 to 70 wt % polymer resin.

In a fourth step of the process, a first Hegman rating of a first sample of the diluted emulsion is measured, as described herein.

In a fifth step of the process, the first Hegman rating of the first sample is compared to an acceptable range for a pre-determined intended end use application to determine if the first Hegman rating is acceptable for the pre-determined intended end use application. If the first Hegman rating of the first sample is not acceptable, then the sixth step is undertaken. Typical Hegman ratings used in coating applications are greater than or equal to 2. All individual values and subranges from greater than or equal to 2 are included and disclosed herein. For example, the Hegman rating can be greater than or equal to 2, 3, 4, 5, 6 or 7. In a particular embodiment, the acceptable range for a pre-determined intended end use application is from 2 to 7, or in the alternative, from 5 to 7, or in the alternative, from 2 to 5, or in the alternative, from 2 to 7, or in the alternative, from 4 to 6, or in the alternative, from 3 to 8, or in the alternative, from 5 to 9.

The optional sixth step of the process involves adjusting the shear work in the dilution mixer, wherein the adjusting the shear work may comprise raising or lowering the shear work. The shear work may be adjusted by any acceptable method or combination of methods. In a particular embodiment, the shear work in the dilution mixer is adjusted by one or more of the following: changing the location of one or more dilution water injection ports of the dilution mixer; changing the flow rates of the water into one or more dilution water injection ports of the dilution mixer; changing the number of dilution water injection ports of the dilution mixer; changing the melt kneader to a different form of melt kneader; changing a mixing speed of the dilution mixer; changing a residence time of the concentrated and/or diluted emulsion in the dilution mixer; and changing the dilution mixer to a different form of dilution mixer.

After the shear work in the dilution mixer is adjusted, the seventh step in the process which comprises measuring a second Hegman rating of a second sample of the diluted emulsion is undertaken. Such measurement is as described herein. The eighth step in the process is determining if the second Hegman rating of the second sample is acceptable for the intended end use application. Such determination is made by comparison as described herein in connection with the first sample.

If the second Hegman rating of the second sample is not within an acceptable range for the pre-determined intended end use application, the optional ninth step of the process is undertaken, namely adjusting the temperature of the concentrated and/or diluted emulsion. Any method for adjusting the temperature of the concentrated and/or diluted emulsion may be used. In a particular embodiment, the adjusting the temperature of the concentrated and/or diluted emulsion comprises one or more of the following: changing a temperature of the melt kneader and/or the dilution mixer; changing a temperature of a transition zone between the melt kneader and the dilution mixer; changing the mixing speed of the melt kneader and/or the dilution mixer; changing the melt kneader to a different form of melt kneader; changing the dilution mixer to a different form of dilution mixer; changing a temperature of the dilution water; and changing a temperature of one or more of the polymer resin, the basic aqueous solution and surfactant solution.

Following the adjusting the temperature of the concentrated and/or diluted emulsion, a third Hegman rating of a third sample of the diluted emulsion is measured. As in connection with the first and second samples, the third Hegman rating is compared to an acceptable range of Hegman ratings for a pre-determined intended end use application.

If the third Hegman rating of the third sample is not acceptable, one or more steps selected from the group consisting of (i) if not earlier added, adding a basic aqueous solution and/or surfactant solution; (ii) adding one or more other additives; and (iii) adjusting the amount of any additive, basic solution or surfactant solution is undertaken. In a particular embodiment, the one or more other additives are selected from the group consisting of water soluble polymers, bases and surfactants.

Thereafter, a fourth Hegman rating of a fourth sample of the diluted emulsion is measured as described herein. As with the first, second and third Hegman ratings, a determination is made whether the fourth Hegman rating is within an acceptable range for a pre-determined intended end use application.

If the fourth Hegman rating is not acceptable, any one or more steps of the group consisting of: adjusting the shear work; adjusting the temperature of the concentrated and/or diluted emulsion; if not earlier added, adding a basic aqueous solution and/or surfactant solution; adding one or more other additives; and adjusting the amount of any additive, basic solution or surfactant solution are undertaken and may be repeated until an acceptable Hegman rating is achieved.

If any of the first, second, third or fourth Hegman rating is within the acceptable range, the diluted emulsion is collected. The diluted emulsion may be collected in any appropriate manner and into any appropriate vessel or container. Such containers include, for example, tanks which may or may not be stirred, pressure-controlled and/or temperature-controlled.

In an alternative embodiment, the process further includes adjusting the temperature of the diluted emulsion prior to the collecting step to prevent any flashing of liquid water to vapor.

Coatings

The diluted emulsion may be coated onto a substrate by various procedures, and for example, by spray coating, curtain flow coating, coating with a roll coater or a gravure coater, brush coating, dipping. The coating is preferably dried by heating the coated substrate to 50 to 150° C. for 1 to 300 seconds although the drying may be accomplished by any suitable means.

Some embodiments of the emulsions described herein are capable of forming a coating which exhibits excellent water resistance, oil resistance, or chemical resistance. Some embodiments exhibit adhesion to non-polar materials, and therefore, when the diluted emulsion of the present invention is coated and dried on the surface of a substrate such as paper, fiber, wood, metal, or plastic molded article, the resulting resin coating will provide the substrate with water resistance, oil resistance, chemical resistance, corrosion resistance and heat sealability. Coatings obtained from some emulsions described herein exhibit excellent moisture resistance, water repellency, thermal adhesion to paper, especially for water and/or grease barrier and ink adhesion coatings layers, metal, glass, wood, fiber (natural fiber and synthetic fiber), and nonwoven fabric, thermal transfer properties, abrasion resistance, impact resistance, weatherability, solvent resistance, flexibility, and adaptability to high-frequency fabricating. Some emulsions are particularly suited for the formation of textile coatings including fabric impregnation. Some emulsions are also suitable for use as carpet backing layers. Coatings for architectural works are also contemplated as well as coatings for controlled release coatings on fertilizer pellets or as coatings to control surface properties such as coefficient of friction.

Some diluted emulsions described herein are used as a binder in a coating composition for a coated wall paper; a fiber coating agent (for improving the strength, moisture adsorption, or water repellency of the fiber); a net for construction, a sizing agent for nylon, polyester or glass fibers; a sizing agent/thermal adhesive of a paper or a nonwoven fabric; and an agent for imparting heat sealability with a paper or a film; a thermal adhesive of a sterilized paper; a binder of an ink or a coating composition; a surface coating agent for a paper or a film adapted for use with an ink jet printer; an agent for improving chipping resistance of an automotive coating composition; and the like.

In some embodiments, the diluted emulsions have additional components in an amount that does not adversely affect the object of the present invention. Exemplary such additional components include water-soluble amino resins such as water-soluble melamine resin and water-soluble benzoguanamine resin and water-soluble epoxy resins for improving coating performance; organic thickeners such as polyvinyl alcohol, polyvinyl pyrrolidone, polyvinyl methylether, polyethylene oxide, polyacrylamide, polyacrylic acid, carboxy methyl cellulose, methyl cellulose, and hydroxyethyl cellulose and inorganic thickeners such as silicon dioxide, active clay, and bentonite for improving the stability and adjusting the viscosity of the emulsion; dispersing agents such as nonionic dispersing agents and anionic dispersing agents and water-soluble polyvalent metal salts for improving the stability of the emulsion; other additives such as anti-rust agent, anti-mold agent, UV absorber, thermal stabilizer, foaming agent, antifoaming agent, and the like; pigments such as titanium white, red iron oxide, phthalocyanine, carbon black, permanent yellow; and fillers such as calcium carbonate, magnesium carbonate, barium carbonate, talk, aluminum hydroxide, calcium sulfate, kaolin, mica, asbestos, mica, and calcium silicate.

EXAMPLES

Olefin-Based Example

6D43 is a random polypropylene copolymer having a melt flow rate (MFR) (230° C./2.16 kg) of 35 g/10 min measured according to ASTM D1238 and which is commercially available from the Braskem Corporation.

PRIMACOR 5980i is ethylene/acrylic acid copolymer which is commercially available from The Dow Chemical Company.

LICOCENE PE MA 6452 is propylene/maleic anhydride copolymer which is commercially available from Clariant Corporation.

6D43 (11.21 lb/hr), PRIMACOR 5980i (3.6 lb/hr), and LICOCENE PE MA 6452 (1.20 lbs/hr) were fed into a 25 millimeter (mm) diameter twin screw extruder using a controlled rate feeder at the indicated rates. These materials were forwarded through the extruder and melted to form a liquid melt material.

The extruder temperature profile was ramped up to approximately 150° C. Water (9.5 g/min) and neutralizing agent (50% wt. DMEA in water, 24.7 g/min) were mixed together and fed to the extruder at the indicated rates. Then dilution water was fed into the extruder via two separate pumps into a dilution zone of the extruder at two locations of the dilution zone at the rates of 48.5 g/min and 48.5 g/min respectively. The extruder temperature profile was cooled back down to give the indicated measured emulsion temperature at the end of the extruder as shown in Table 1. The extruder speed was approximately 500 revolutions per minute (rpm). At the extruder outlet, a backpressure regulator was used to adjust the pressure inside the extruder barrel to a pressure adapted to reduce steam formation (generally, the pressure is about 350 psia).

An aqueous emulsion product exited from the extruder. The aqueous emulsion was filtered through a 200 micron filter. The resultant filtered aqueous emulsion had a solids content measured in weight percent (47 wt %); and the solids particles of the emulsion had a mean particle size measured in microns (Vmean=0.8 microns). The solids content of the aqueous dispersion was measured using a microwave solids analyzer; and the particle size of the solids particles of the aqueous dispersion was measured using a Coulter LS-230 particle size analyzer (available from Beckman Coulter Corporation). The Hegman rating of the emulsion was read from a standard Hegman grind gauge once the emulsion had cooled to room temperature.

TABLE 1

| Emulsion Temperature at Extruder Outlet | Emulsion Hegman Rating |
| --- | --- |
| 110° C. | 0 |
| 70° C. | 8 |

The ability to modify the Hegman rating of the diluted emulsion by variation of the temperature at the extruder outlet is clearly seen from Table 1.

Alkyd-Based Example

The synthesis protocol used in the preparation of alkyd resins was a single stage polyesterification method. The tall oil fatty acid (TOFA) along with coconut fatty acid (CocoFA) was charged to a 2-piece, 5 L four-neck round bottom flask and a metal stir rod with paddle was placed through the middle joint of the flask. The free end of the stir rod was tightened in the overhead mixer motor chuck and the flask was secured to a lattice. A heating mantle was raised to contain the lower half of the reactor. The setpoint on the mantle was set at 220° C. and heating and stirring were started. To the stirred oil, isophthalic acid, phthalic anhydride, benzoic acid, trimethylolethane, pentaerythritol and dibutyltinoxide (DBTO) (1200 ppm on charge) were added. Once all reactants were added, a packed column condenser with a set point of 95° C. (running glycol-water mixture through a circulating bath) was fit into a second reactor top joint. This packed column was topped with a 45-degree bent glass adapter having a hosebarb outlet that was connected to a bubbler with tygon tubing. The glass adapter was part of a short-path total condenser which held a round bottom receiving flask. To the third reactor top joint, a hosebarb adaptor was attached and connected to a nitrogen inlet. The fourth joint was an inlet for the thermocouple, attached to the heating controller, which supplied power to the mantle. The thermocouple tip was submerged below the surface of the reactor contents by at least one inch. A slow nitrogen sweep was placed on the system and observed in the bubbler. The reaction mixture was allowed to heat and mix while the temperature was climbing to the setpoint temperature. A typical synthesis recipe is shown in Table 2.

TABLE 2

| Monomer | Parts |
| --- | --- |
| Trimethylolethane (TME) | 107.0 |
| Pentaerythritol (PE) | 0.0 |
| Tall Oil Fatty Acid (TOFA) | 90.5 |
| Coconut Fatt Acid (CocoFA) | 7.9 |
| Benzoic Acid (BA) | 12.0 |
| Phthalic anhydride (PAN) | 72.8 |
| Isophthalic acid (IPA) | 48.6 |

The esterification process step can range from about 4 hours to 8 hours depending on the catalyst, mixing, oil type, and polyol ingredients. The reaction is monitored by removing samples from the reactor and titrating the acid value (AV). The complete clarification and solubility of all powdered acids indicates the reaction of at least half the acid groups. This is a good starting point to take a small aliquot from the reactor and titrate the resin in process. The reaction was allowed to progress until the desired AV was reached, in this case an AV 8-10, then the reaction contents were poured into a glass jar and allowed to cool to room temperature under a pad of nitrogen. The material was then ready for neutralization and emulsion.

Acid Value Determination

Acid values were measured by removing approximately 2-4 g of resin from the reactor using a glass pipette and weighing into a clean 250 mL Erlenmeyer flask. To the flask, 25 mL of 50/50 isopropanol/xylenes mixture was added along with a stir bar. The flask was placed on a stirrer/hot plate and allowed to mix with gentle heating until the material was dissolved. Then, a few drops of phenolphthalein indicator solution were added to the flask and the contents were titrated to the phenolphthalein endpoint using 0.1N potassium hydroxide in methanol. The AV was then calculated as below:

AV (mg KOH/g sample)=ml 0.1M KOH titrant× 5.61/g sample

Emulsion Process

Alkyd resin (solvent-free, acid value 8.0 mg KOH/g) was heated to 95° C. (overnight to form a molten state) and fed into a 2" diameter primary rotor-stator mixer at 15 g/min by a gear style pump. 28 percent (weight/weight) ammonium hydroxide solution was fed at 0.117 g/min and blended with additional water pumped at a rate of 4.0 g/min and additional surfactant E-Sperse 100 (60 percent active in water, an anionic surfactant commercially available from Ethox Chemicals, LLC (Greenville, S.C., USA)) pumped at a rate of 1.0 g/min and injected into the primary mixer to create the emulsion. All the liquid feeds were supplied by ISCO syringe pumps or HPLC pumps. The primary mixer speed was set at approximately 1300 rpm. The average particle size diameter of the emulsion concentrate was 0.12 microns. This alkyd emulsion concentrate had a solid content of approximately 77%. The alkyd emulsion concentrate was then diluted in a secondary rotor-stator mixer by adding water at 50 parts per 100 parts of emulsion to the inboard side of the mixer, allowing that mixture to mix in the mixing elements of the secondary rotor-stator mixer, the secondary mixer speed was set at approximately 500 rpm, and then collecting diluted emulsion 1, having a solid content of approximately 50 weight percent and a Hegman rating of 5 (Alkyd Example 1).

The alkyd emulsion concentrate (Example 1) was then diluted stagewise in a secondary rotor-stator mixer by first adding water at 37 parts per 100 parts of emulsion to the inboard side of the secondary mixer, allowing that mixture to mix in the mixing elements of the secondary rotor stator, the secondary mixer speed was set at approximately 500 rpm, and then by adding additional water at 9 parts per 100 parts of the already diluted emulsion to the outboard side of the mixer, thereby forming diluted emulsion 2, having a solid content of approximately 50 weight percent and a Hegman rating >7 (Alkyd Example 2).

The alkyd emulsion concentrate (Example 1) was then diluted stagewise in a secondary rotor-stator mixer by first adding water at 25 parts per 100 parts of emulsion to the inboard side of the secondary mixer, allowing that mixture to mix in the mixing elements of the secondary rotor stator, the secondary mixer speed was set at approximately 500 rpm, and then by adding additional water at 20 parts per 100 parts of the already diluted emulsion to the outboard side of the mixer, thereby forming diluted emulsion 3, having a solid content of approximately 50 weight percent and a Hegman rating 6 (Alkyd Example 3).

The alkyd emulsion concentrate (Example 1) was then diluted stagewise in a secondary rotor-stator mixer by first adding water at 12 parts per 100 parts of emulsion to the inboard side of the secondary mixer, allowing that mixture to mix in the mixing elements of the rotor stator, the secondary mixer speed was set at approximately 500 rpm, and then by adding additional water at 33 parts per 100 parts of the already diluted emulsion to the outboard side of the secondary mixer, thereby forming diluted emulsion 4, having a solid content of approximately 50 weight percent and a Hegman rating 0 (Alkyd Example 4).

The alkyd emulsion concentrate (Example 1) was then diluted in a secondary rotor-stator mixer by adding water at 50 parts per 100 parts of emulsion to the outboard side of the secondary mixer, allowing that mixture to mix in the mixing elements of the rotor stator, the secondary mixer speed was set at approximately 500 rpm, and then collecting diluted emulsion 5, having a solid content of approximately 50 weight percent and a Hegman rating of 5 (Alkyd Example 5).

The alkyd emulsion concentrate (Example 1) was then diluted stagewise in a secondary rotor-stator mixer by first adding water at 37 parts per 100 parts of emulsion to the inboard side of the secondary mixer, allowing that mixture to mix in the mixing elements of the rotor stator, the secondary mixer speed was set at approximately 270 rpm, and then by adding additional water at 9 parts per 100 parts of the already diluted emulsion to the outboard side of the mixer, thereby forming diluted emulsion 6, having a solid content of approximately 50 weight percent and a Hegman rating 1 (Alkyd Example 6).

The alkyd emulsion concentrate (Example 1) was then diluted stagewise in a secondary rotor-stator mixer by first adding water at 37 parts per 100 parts of emulsion to the inboard side of the secondary mixer, allowing that mixture to mix in the mixing elements of the rotor stator, the secondary mixer speed was set at approximately 950 rpm, and then by adding additional water at 9 parts per 100 parts of the already diluted emulsion to the outboard side of the mixer, thereby forming diluted emulsion 7, having a solid content of approximately 50 weight percent and a Hegman rating 0 (Alkyd Example 7).

The alkyd emulsion concentrate (Example 1) was then diluted in a secondary rotor-stator mixer by adding water at 50 parts per 100 parts of emulsion to the outboard side of the secondary mixer, allowing that mixture to mix in the mixing elements of the rotor stator, the secondary mixer speed was set at approximately 950 rpm, and then collecting diluted emulsion 8, having a solid content of approximately 50 weight percent and a Hegman rating of 1 (Alkyd Example 8).

Alkyd resin (solvent-free, acid value 8.0 mg KOH/g) was heated to 95° C. (overnight to form a molten state) and fed into a primary rotor-stator mixer at 15 g/min. 28 percent (weight/weight) ammonium hydroxide solution was fed at 0.117 g/min and blended with additional water pumped at a rate of 4.0 g/min and additional surfactant E-Sperse 100 (60 percent active in water) pumped at a rate of 2.0 g/min and injected into the primary mixer to create the emulsion. The primary mixer speed was set at approximately 1300 rpm. The volume average particle size diameter of the emulsion concentrate was 0.10 microns. The emulsion concentrate had a solid content of approximately 77%. The alkyd emulsion concentrate was then diluted in a secondary rotor-stator mixer by adding water at 47 parts per 100 parts of emulsion to the inboard side of the secondary mixer, allowing that mixture to mix in the mixing elements of the rotor stator, the secondary mixer speed was set at approximately 500 rpm, and then collecting diluted emulsion 9, having a solid content of approximately 50 weight percent and a Hegman rating of 0 (Alkyd Example 9).

TABLE 4

| Example | Dilution Mixer RPM | First dilution Rate (mL/min) | Second dilution Rate (mL/min) | Surfactant Loading (% based on resin) | Hegman |
|---|---|---|---|---|---|
| Alkyd Ex. 1 | 500 | 10.0 | 0.0 | 4 | 5 |
| Alkyd Ex. 2 | 500 | 7.5 | 2.5 | 4 | 7 |
| Alkyd Ex. 3 | 500 | 5.0 | 5.0 | 4 | 6 |
| Alkyd Ex. 4 | 500 | 2.5 | 7.5 | 4 | 0 |
| Alkyd Ex. 5 | 500 | 0.0 | 10.0 | 4 | 5 |
| Alkyd Ex. 6 | 270 | 7.5 | 2.5 | 4 | 1 |
| Alkyd Ex. 7 | 950 | 7.5 | 2.5 | 4 | 0 |
| Alkyd Ex. 8 | 950 | 0.0 | 10.0 | 4 | 1 |
| Alkyd Ex. 9 | 500 | 0.0 | 10.0 | 8 | 0 |

Epoxy Resin Examples

The nonvolatile phase of Dow Oudrasperse 6001 epoxy/surfactant dispersion (which is commercially available from The Dow Chemical Company) was placed in an oven at 90° C. overnight to melt the resin. The approximate amount of each component was weighed and mixed thoroughly in a rotary evaporator flask before it was added to the feed tank. The resin feed tank temperature was typically set to 85° C. The polymer was fed to the gear pump by a nitrogen head pressure on the tank of ~30 psi. The gear pump was typically set to pump the resin to the primary mixer at 60 g/min.

The amount of surfactant present in the emulsion as well as variation in the process conditions on grit formation were investigated, including the following: (i) altering the surfactant concentration; (ii) changes to the location of the second stage dilution injection; (iii) altering RPMs in the second mixer; and (iv) altering the temperature in the first mixer.

Epoxy resin and epoxy reactive surfactant were poured into a stirred, jacketed feed vessel. The jacket was kept at a constant 85 C. A nitrogen head pressure of 30 psig padded the feed vessel to maintain a dry atmosphere, but also assist the feeding of resin to the gear pump. The gear pump metered the resin to the primary mixer. Separately fed to the primary mixer was an initial aqueous feed of de-ionized water. The resin, surfactant, and water were mixed to form a High Internal Phase Emulsion (HIPE) at 84% solids. This HIPE was continuously pumped to a secondary mixer where another stream of de-ionized water was used to dilute the emulsion to a final solids level shown in the Table 5.

Epoxy Example 1 shows the standard flow rates, temperatures and mixer speeds typically used. Epoxy Example 2-5 examines the Hegman change as a function of dilution water injection location. As we move the injection of water from the HIPE inlet side to the final product side of the secondary mixer we see a significant decrease the size and concentration of grit from a Hegman rating of 2 to a perfect Hegman rating of 8. Epoxy Examples 6-9 examine the Hegman change as a function of RPMs of the rotor in the secondary mixer. As the mixer RPMs are increased from 300 RPMs to 1300 RPMs, the Hegman rating is decreased from an 8 to a 0. Both an increase in size and concentration of grit is observed. Epoxy Examples 10-12 examine the Hegman change as a function of the temperature in the primary mixer. As the temperature is decreased from 90 C to 70 C, the Hegman rating improves from a 0 to a 6.5 rating.

TABLE 5

| Resin | Polymer Feed Rate (g/min) | Initial Aqueous Rate g/min | Mixer 1 Speed (RPM) | Dilution 1 Rate g/min | Dilution 2 Rate g/min | Mixer 2 Speed (RPM) | Particle Size (volume average) micron | Hegman Rating unitless | Resin Temp. Degree C. |
|---|---|---|---|---|---|---|---|---|---|
| Epoxy Exp. 1 | 60 | 12 | 400 | 56 | 0 | 400 | 0.43 | 2.5 | 80 |
| Epoxy Exp. 2 | 60 | 12 | 400 | 42 | 14 | 400 | 0.43 | 3 | 80 |
| Epoxy Exp. 3 | 60 | 12 | 400 | 28 | 28 | 400 | 0.43 | 5 | 80 |
| Epoxy Exp. 4 | 60 | 12 | 400 | 14 | 42 | 400 | 0.43 | 6 | 80 |
| Epoxy Exp. 5 | 60 | 12 | 400 | 0 | 56 | 400 | 0.43 | 8 | 80 |
| Epoxy Exp. 6 | 60 | 12 | 400 | 0 | 56 | 300 | 0.43 | 8 | 80 |
| Epoxy Exp. 7 | 60 | 12 | 400 | 0 | 56 | 400 | 0.43 | 8 | 80 |
| Epoxy Exp. 8 | 60 | 12 | 400 | 0 | 56 | 700 | 0.43 | 2 | 80 |
| Epoxy Exp. 9 | 60 | 12 | 400 | 0 | 56 | 1000 | 0.43 | 0 | 80 |
| Epoxy Exp.10 | 60 | 12 | 400 | 56 | 0 | 400 | 0.43 | 0 | 90 |
| Epoxy Exp. 11 | 60 | 12 | 400 | 56 | 0 | 400 | 0.43 | 2.5 | 80 |
| Epoxy Exp. 12 | 60 | 12 | 400 | 56 | 0 | 400 | 0.43 | 6.5 | 70 |

Hegman Rating

Hegman values were determined in accordance with ASTM D1210. The Hegman gauge is a National Standard scale that is used in several industries including paint, plastic, ceramic, pharmaceuticals and food in controlling the production, storage and application of emulsion products. The gauge ranges from zero to eight with the particle size decreasing as the number increases.

To measure a Hegman rating a small amount of the sample to be tested was placed at the top end of the groove. A straight edge metal scraper provided with the Hegman gauge was used to draw the sample towards the lower end of the groove. The samples were rated by the first appearance of the oversize particles in substantial concentrations. Table 7 shows the Hegman rating and corresponding particle size.

TABLE 7

| Hegman Rating | Particle Size/μm |
|---|---|
| 0 | 100 |
| 1 | 87.5 |
| 2 | 75.0 |
| 3 | 62.5 |
| 4 | 50.0 |
| 5 | 37.5 |
| 6 | 25.0 |
| 7 | 12.5 |
| 8 | 0 |

We claim:

1. A method for optimizing a Hegman rating of a diluted emulsion comprising:
(a) feeding a molten polymer resin into a melt kneader;
(b) feeding an initial water stream into the melt kneader;
(c) feeding a basic aqueous solution and/or a dispersing agent into the melt kneader to form a concentrated emulsion, wherein the concentrated emulsion comprises from greater than 60 wt % polymer resin solids;
(d) feeding the concentrated emulsion into a dilution mixer wherein water is continuously or in a single or multi-stage manner added to the concentrated emulsion to dilute the concentrated emulsion to form a diluted emulsion, wherein the diluted emulsion comprises equal to or less than 70 wt % polymer resin solids;
(e) measuring a first Hegman rating of a first sample of the diluted emulsion;
(f) adjusting the shear work in the dilution mixer, wherein the adjusting the shear work may comprise raising or lowering the shear work;
(g) measuring a second Hegman rating of a second sample of the diluted emulsion;
(h) determining if the second Hegman rating of the second sample is acceptable for the intended end use application;
(i) adjusting the temperature of the concentrated and/or diluted emulsion;
(j) measuring a third Hegman rating of a third sample of the diluted emulsion;
(k) determining if the third Hegman rating of the third sample is acceptable for the intended end use application; and
(l) conducting one or more steps selected from the group consisting of (i) adding a basic aqueous solution and/or surfactant solution into the melt kneader; (ii) adjusting the amount of any the basic solution or surfactant solution added into the melt kneader;
(m) measuring a fourth Hegman rating of a fourth sample of the diluted emulsion;
(n) determining if the fourth Hegman rating of the third sample is acceptable for the intended end use application;
(o) if the fourth Hegman rating is not acceptable, repeating any one or more of steps (f), (i) and (l);
(p) if the fourth Hegman rating is acceptable, collecting the diluted emulsion.

2. The method for optimizing a Hegman rating of a diluted emulsion of claim 1, wherein an acceptable Hegman rating for the intended end use application is greater than or equal to 2.

3. The method for optimizing a Hegman rating of a diluted emulsion according to claim 1, wherein adjusting the shear work in the dilution mixer comprises one or more of the following steps:
- changing the location of one or more dilution water injection ports of the dilution mixer;
- changing the flow rates of the water into one or more dilution water injection ports of the dilution mixer;
- changing the number of dilution water injection ports of the dilution mixer;
- changing a mixing speed of the dilution mixer;
- changing a residence time of the concentrated and/or diluted emulsion in the dilution mixer; and
- changing the dilution mixer to a different form of dilution mixer.

4. The method for optimizing a Hegman rating of a diluted emulsion according to claim 1, wherein the adjusting the temperature of the concentrated and/or diluted emulsion comprises one or more of the following steps:
- changing a temperature of the melt kneader and/or the dilution mixer;
- changing a temperature of a transition zone between the melt kneader and the dilution mixer;
- changing the mixing speed of the melt kneader and/or the dilution mixer;
- changing the melt kneader to a different form of melt kneader;
- changing the dilution mixer to a different form of dilution mixer;
- changing a temperature of the dilution water; and
- changing a temperature of one or more of the polymer resin, the basic aqueous solution and surfactant solution.

5. The method for optimizing a Hegman rating of an aqueous polymeric emulsion according to claim 1, wherein the polymer resin is selected from the group consisting of polyolefin resins, polyester resins, and epoxy resins.

6. The method according to claim 5, wherein the diluted emulsion comprises less than 10 percent by weight surfactant based on the weight of the polymer resin, wherein the polymer resin comprises an alkyd and/or epoxy resin.

7. The method according to claim 1, wherein the concentrated emulsion has an average particle size from 0.05 to 5 microns.

8. The method according to claim 1, further comprising adjusting the temperature of the diluted emulsion prior to the collecting step to prevent any flashing of liquid water to vapor.

* * * * *